United States Patent

[11] 3,595,464

[72] Inventor James M. Harrison
 Fort Worth, Tex.
[21] Appl. No. 864,235
[22] Filed May 28, 1969
[45] Patented July 27, 1971
[73] Assignee Crown Molding Co.
 Dallas, Tex.

[54] INSULATED VENDING CUP
 3 Claims, 4 Drawing Figs.
[52] U.S. Cl. .................................................. 229/1.5 B,
 117/100 R, 117/138.8 B, 161/161, 161/168, 215/1 C, 229/3.5 R
[51] Int. Cl. ...................................................... B65d 1/00, B65d 25/14

[50] Field of Search............................................ 117/100 R, 138.8 B; 161/161, 168; 229/1.5 B, 3.5; 215/1.5

[56] References Cited
UNITED STATES PATENTS

| | | | |
|---|---|---|---|
| 3,013,306 | 12/1961 | Richie | 229/1.5 UX |
| 3,236,681 | 2/1966 | Nemphos | 117/100 R |
| 3,277,220 | 10/1966 | Plymale | 229/1.5 B X |
| 3,484,262 | 12/1969 | Hahn | 117/100 X |

Primary Examiner—Donald F. Norton
Attorney—Parker, Carter & Markey

ABSTRACT: A one-time use, throwaway, inexpensive, thin wall cup primarily intended for use in vending machines preferably of the coin-controlled type, and specially constructed so that static electricity will not remain or accumulate thereon.

PATENTED JUL 27 1971
3,595,464
fig.1.
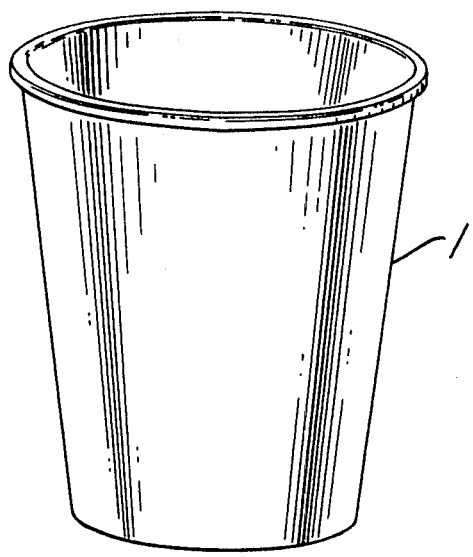
fig.2.
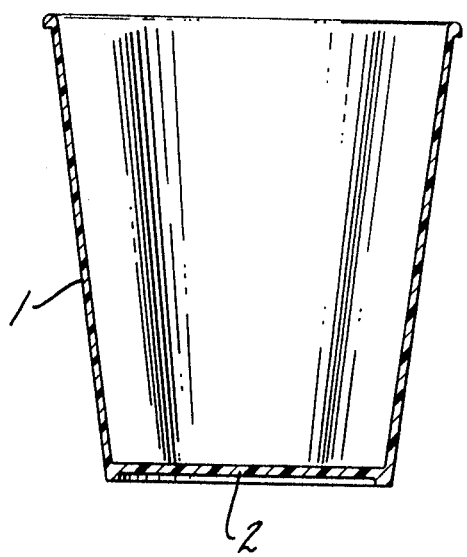
fig.3.
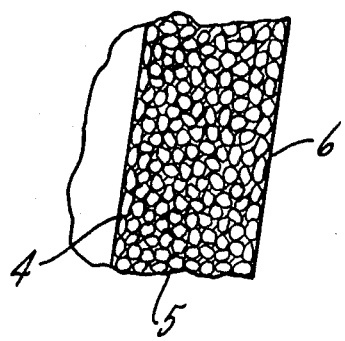
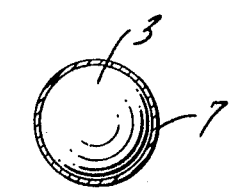
fig.4.
INVENTOR.
James M. Harrison
BY Parker, Carter & Markey

3,595,464

INSULATED VENDING CUP

SUMMARY OF THE INVENTION

This invention is in the field of foam plastic articles and is concerned with a foam plastic cup, preferably made of foam polystyrene, specifically intended as a vending cup to be used preferably in coin-controlled vending machines.

A primary object of the invention is a foam polystyrene cup which is constructed to prevent the accumulation or retention of static electricity thereon.

Another object is a cup of the above type which can be used successfully in the vending machine trade.

Another object is a cup of the above type with a total weight of on the order of 2 to 3 grams.

Another object is a cup of the above type which is molded from foam polystyrene beads in a closed mold and has a sufficiently thin wall such that an adequate number can be stacked in inventory in conventional vending machines.

Another object is a cup of the above type having a wall thickness on the order of from 0.030 to 0.050 inches.

Another object is a homogeneous foram polystyrene cup molded from individual expanded polystyrene beads which have been preliminarily coated with a destaticizing agent, such as a detergent so that the resulting cup will be, to a degree, hygroscopic thereby preventing or eliminating the accumulation of an electrostatic charge thereon.

Other objects will appear from time to time in the ensuing specification and drawings in which:

BRIEF DESCRIPTION OF THE DRAWINGS

FIG. 1 is a perspective view of the cup;
FIG. 2 is a vertical section through the cup of FIG. 1;
FIG. 3 is a part of the wall section of the cup on an enlarged scale; and
FIG. 4 is an enlarged view of an individual foram polystyrene bead from which the cup is molded.

DESCRIPTION OF THE PREFERRED EMBODIMENT

The cup shown in Figures 1 and 2 has a continuous sidewall 1 with an integral bottom 2. The cup is suitable for containing either hot or cold drinking liquids, for example coffee, soda pop, or the like. In Figure 3 an enlarged section of a wall 1 is shown. The inner surface of the cup is an impervious, liquid-resistant, wafer-thin, rigid shell or "glaze" with a highly cellular body or intermediate insulating portion 5 formed integrally with the shell. The outer surface 6 is the same as the inner surface 4, namely a glazed, impervious, rigid shell. The inner or outer surfaces or shells 4 and 6 are formed integrally with the inner portion or cellular body 5. The body is a highly cellular, integral, homogenous, heat-transfer-resistant continuation of the two wafer-thin, rigid shells 4 and 6.

Cups of this type have seen previously molded in what can be considered relatively thick wall sections, the thinnest being on the order of 0.065 with 0.080 inches being more conventional. A cup with such a wall thickness cannot be successfully used in the vending trade because its separation between adjacent cups in a stack is too great. This results in too few cups being stored in the tubes and inventory space in vending machines for practical use. It is highly desirable if not absolutely essential that the stack spacing be as small as possible so that more instead of less cups can be preliminarily stacked in a given space in conventional vending machines. This requires that the wall section or thickness of the walls in vending cups be as small as possible so that more instead of less cups can be stacked in a given space.

Since a large portion if not the majority of the cups dispensed in coin-controlled vending machines are for hot coffee, it is also desirable that the cups have a substantial amount of self-insulation so that the purchaser of the coffee will not burn his hands or feel any appreciable discomfort due to rapid and substantial heat transfer through the walls of the cup. Making cups out of foam polysytrene beads in the past has solved this problem, but the thickness of such cups has prevented their use in vending machines.

By the present invention, the wall thickness of the cup is brought down to something on the order of 0.030 to 0.050 inches, which gives a total stack height providing an inventory completely acceptable in vending machines. The resulting cups weigh on the order of 2 to 3 grams as compared to previous hot drink vending cups which weigh on the order of 7 grams.

But the light weight of these vending cups—2 to 3 grams—creates a problem since the cups must be dropped one at a time by the automatic parts of the vending machine. The cups are so lightweight that static electricity which previously has formed or accumulated thereon will prevent the cups from freely falling. In fact, the buildup of static electricity has been known to cause a lightweight cup to jump back up even after it has been separated from the stack by an inch or so.

The buildup of static electric charges on the lightweight cups can be reduced or completely eliminated by increasing the conductivity of the foam polystyrene beads so that the charge will flow or leak off. In Figure 4 a greatly enlarged bead 3 has been shown, and while it has been shown as spherical, it should be understood that the beads in practice are not necessarily perfectly spherical. The bead is preliminarily coated with a detergent, for example a highly concentrated, neutral, anionic, synthetic detergent whose active ingredients may include a modified aluminum lauryl sulfate and an organic amide builder. A suitable detergent presently being sold under the trademark "Orvus K" is put out by the Proctor and Gamble Company of Cincinnati, Ohio. In FIG. 4, the detergent is shown in the form of a coat or film 7 on the raw beads, and it will be understood that the thickness of the film is greatly exaggerated in FIG. 4 for purposes of illustration. The film of detergent is preferably applied by tumbling the beads in some sort of a container and adding the detergent in liquid form. During tumbling, it may be assumed that the detergent will fully coat the entire surface of all beads resulting in the film shown in FIG. 4.

When the beads are subsequently prefoamed and charged into a thin-wall mold and there heated, they will expand and fuse together with the detergent film between adjacent beads permeating from one wall to the other of the resultant cup, as at 4 and 6 in FIG. 3. Both exposed surfaces may also be considered to be covered with film so that the entire thin wall cup has a hygroscopic film which will attract moisture from the air thereby eliminating the buildup or accumulation of static electricity. Hence, the resultant cup can be effectively and successfully used for vending purposes because it will not accumulate static electricity. Therefore, it can be dispensed and a satisfactory number can be stacked and stored in a given height.

While the preferred form of the invention has been shown and described, it should be understood that suitable additional modifications, changes, substitutions and alterations may be made without departing from the invention's fundamental theme. For example, a cup made from foam polystyrene has been referred to, but other equivalent plastics may be used. The particular example of the destaticizing agent, in this case a detergent, is only given by way of example, and other such agents may be used which will give the resultant cup and desired hygroscopic characteristic.

I claim:

1. A substantially rigid thin wall cup made of expanded polystyrene beads for use as a vending cup formed from polystyrene beads coated with a detergent such that the expanded beads forming the walls and bottom of the cup, when fused together, provide a detergent film on the exposed surfaces of the cup as well as in the interface between adjacent fused beads through the walls and bottom of the cup so as to eliminate or prevent the accumulation of static electricity on the surfaces of the cup wall.

2. The structure of claim 1 in which the thickness of the cup wall is on the order of 0.030 to 0.050 inch.

3. The structure of claim 1 further characterized in that the total weight of the cup